US009829689B2

(12) United States Patent
Hukkanen

(10) Patent No.: US 9,829,689 B2
(45) Date of Patent: Nov. 28, 2017

(54) LIGHT GUIDE FOR MODIFYING A LIGHT DISTRIBUTION PATTERN

(71) Applicant: LEDIL OY, Salo (FR)

(72) Inventor: Hannu Hukkanen, Turku (FI)

(73) Assignee: LEDIL OY, Salo (FI)

( * ) Notice: Subject to any disclaimer, the term of this patent is extended or adjusted under 35 U.S.C. 154(b) by 221 days.

(21) Appl. No.: 14/891,481

(22) PCT Filed: Mar. 4, 2014

(86) PCT No.: PCT/FI2014/050157
§ 371 (c)(1),
(2) Date: Nov. 16, 2015

(87) PCT Pub. No.: WO2014/184422
PCT Pub. Date: Nov. 20, 2014

(65) Prior Publication Data
US 2016/0116723 A1     Apr. 28, 2016

(30) Foreign Application Priority Data
May 14, 2013   (FI) ..................... 20135504

(51) Int. Cl.
*H01L 33/60* (2010.01)
*F21V 5/04* (2006.01)
(Continued)

(52) U.S. Cl.
CPC ............ *G02B 17/086* (2013.01); *F21V 5/045* (2013.01); *F21V 7/0091* (2013.01); *F21V 7/22* (2013.01);
(Continued)

(58) Field of Classification Search
CPC ...... G02B 17/086; G02B 6/0016; G02B 3/08; G02B 6/0043; G02B 5/021; G02B 6/004;
(Continued)

(56) References Cited

U.S. PATENT DOCUMENTS

| 2,058,707 A | 10/1936 | Mcgregor |
| 2,567,656 A | 9/1951 | Jan |

(Continued)

FOREIGN PATENT DOCUMENTS

| CN | 101907263 | 12/2010 |
| DE | 10 2009 02 3916 A1 | 12/2010 |

(Continued)

OTHER PUBLICATIONS

Avago Technologies, Light Guide Techniques, Using LED Lamps, Application Brief I-003, Nov. 12, 2006.

(Continued)

*Primary Examiner* — Peggy Neils
(74) *Attorney, Agent, or Firm* — Young & Thompson

(57) ABSTRACT

A light guide (201) including a transparent element is presented. The transparent element includes a first surface (203) for acting as a light-ingress surface and a second surface (204) for acting as a light-egress surface. The second surface includes elevations (205) for directing a part of the light into directions sideward with respect to a direction in which another and greater part of the light exits the transparent element through the second surface. Each elevation is shaped to provide total internal reflection for a light beam on a first point of the surface of the elevation and refract the reflected light beam on a second point of the surface of the elevation so as to direct the light beam sideward. The sideward directed light enables an observer, who sees the light guide from a small viewing angle, to easily see whether the light is on or off.

15 Claims, 8 Drawing Sheets

(51) Int. Cl.
*G02B 17/08* (2006.01)
*G02B 3/08* (2006.01)
*G02B 5/02* (2006.01)
*F21V 8/00* (2006.01)
*G02B 19/00* (2006.01)
*F21V 7/00* (2006.01)
*F21V 7/22* (2006.01)

(52) U.S. Cl.
CPC ............... *G02B 3/08* (2013.01); *G02B 5/021* (2013.01); *G02B 6/0016* (2013.01); *G02B 6/0043* (2013.01); *G02B 19/0061* (2013.01)

(58) Field of Classification Search
CPC ......... G02B 6/0035; F21V 5/04; F21V 5/045; F21V 7/0091; H01L 33/60
See application file for complete search history.

(56) References Cited

U.S. PATENT DOCUMENTS

| | | | |
|---|---|---|---|
| 6,087,653 A | 7/2000 | Van Schyndel et al. | |
| 6,473,554 B1 | 10/2002 | Pelka et al. | |
| 6,616,305 B1 | 9/2003 | Simon | |
| 7,270,454 B2 * | 9/2007 | Amano | F21S 48/215 362/328 |
| 7,813,055 B2 * | 10/2010 | Yasumoto | G02B 3/08 359/742 |
| 7,837,359 B2 * | 11/2010 | Danek | F21V 5/04 362/309 |
| 8,042,975 B2 * | 10/2011 | Shyu | G02B 3/08 359/742 |
| 2003/0094566 A1 | 5/2003 | Hamalainen et al. | |
| 2006/0109673 A1 | 5/2006 | Godoy | |
| 2006/0203494 A1 | 9/2006 | Ohkawa | |
| 2010/0177526 A1 | 7/2010 | Futami | |
| 2010/0284194 A1 | 11/2010 | Miyashita et al. | |
| 2011/0286221 A1 | 11/2011 | Saito | |
| 2012/0075870 A1 | 3/2012 | Kayanuma et al. | |
| 2012/0134152 A1 * | 5/2012 | Ye | F21V 5/04 362/235 |
| 2013/0010454 A1 | 1/2013 | Takayama et al. | |

FOREIGN PATENT DOCUMENTS

| | | |
|---|---|---|
| EP | 1 422 470 A1 | 5/2004 |
| JP | S62153709 U | 9/1987 |
| JP | 2006235394 | 9/2006 |

OTHER PUBLICATIONS

International Search Report, dated Jun. 11, 2014, from corresponding PCT application.
FR Search Report, dated Feb. 4, 2014, from corresponding FR application.
Chinese Search Report dated Jul. 1, 2016; Application No. 201480026948.2.

* cited by examiner

LIGHT GUIDE FOR MODIFYING A LIGHT DISTRIBUTION PATTERN

FIELD OF THE INVENTION

The invention relates generally to illuminating engineering. More particularly, the invention relates to a light guide for modifying a light distribution pattern of a light source that can be, for example but not necessarily, a light emitting diode "LED".

BACKGROUND

Distribution of light produced by a light source can be important or even critical in some applications. The light source can be, for example but not necessarily, a light emitting diode "LED", a filament lamp, or a gas-discharge lamp. FIG. 1 shows a view of a section taken from an exemplifying light guide 101 according to the prior art for modifying a light distribution pattern of a light source 102. Some of the light beams radiated by the light source 102 are depicted with dashed line arrows in FIG. 1. The light guide 101 can be rotationally symmetric with respect to a geometric line 120 shown in FIG. 1. The geometric line 120 is parallel with the z-axis of a coordinate system 199. The light guide 101 is made of transparent material having refractive index greater than unity. The light guide comprises a first surface 103 for acting as a light-ingress surface for receiving light emitted by the light source 102, and a second surface 104 for acting as a light-egress surface where the light exits the light guide. Both the first and second surfaces of the light guide comprise prism ridges for collimating the light emitted by the light source 102. In FIG. 1, one of the prism ridges of the first surface 103 is denoted with the reference number 111 and one of the prism ridges of the second surface 104 is denoted with the reference number 112. In a case where the light guide is rotationally symmetric, the prism ridges are advantageously formed concentrically around the geometric line 120. A light guide of the kind shown in FIG. 1 is presented for example in publication US20110286221.

An inconvenience related to light guides of the kind described above is that it may be quite difficult to see whether the light source 102 is on or off when the light guide 101 is seen so that the viewing angle α shown in FIG. 1 is small. For example, in conjunction with kitchen and other domestic lightning applications it would be advantageous if one could see whether the light is on or off, also when the viewing angle is small.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new light guide for modifying the light distribution pattern of a light source. A light guide according to the invention comprises a transparent element made of transparent material having refractive index greater than unity. The transparent element comprises:

- a first surface for acting as a light-ingress surface for receiving light, and
- a second surface for acting as a light-egress surface where the light exits the transparent element.

The second surface comprises one or more elevations for directing a first part of the light into one or more directions that are sideward with respect to a direction in which a second part of the light exits the transparent element through the second surface, where the second part of the light is more than half of the light exiting the transparent element through the second surface. Each elevation is shaped to provide total internal reflection for a light beam belonging to the first part of the light at a first point of the surface of the elevation and refract the reflected light beam at a second point of the surface of the elevation so as to direct the light beam sideward.

In a situation where the light guide is seen so that the viewing angle is small, the sideward directed light makes it easier to see whether the light source is on or off. The part of the light directed sideward by the elevations is advantageously at most 10% of all of the light exiting the transparent element through the second surface. In many cases, it is sufficient that the sideward directed light is only few per cents of the light exiting the transparent element through the second surface, e.g. 3-5%. This can be achieved so that the above-mentioned elevations are nodules each being surrounded by areas of the second surface between the nodules, and the diameter of the smallest circle capable of surrounding a base of one or more of the nodules is at most 10% of the smallest distance between adjacent ones of the nodules.

In accordance with the invention, there is provided also a new illuminator device comprising at least one light source and at least one light guide according to the invention. The at least one light source may comprise, for example, one or more light emitting diodes "LED".

A light guide according to an exemplifying and non-limiting embodiment of the invention is a single piece of transparent material that can be manufactured, for example, by mold casting. In accordance with the invention, there is provided also a new mold having a form suitable for manufacturing, by mold casting, the abovementioned single piece of the transparent material.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which:

FIG. 1 has already been explained in the Background-section of this document.

DESCRIPTION OF EXEMPLIFYING EMBODIMENTS

Figure 1:
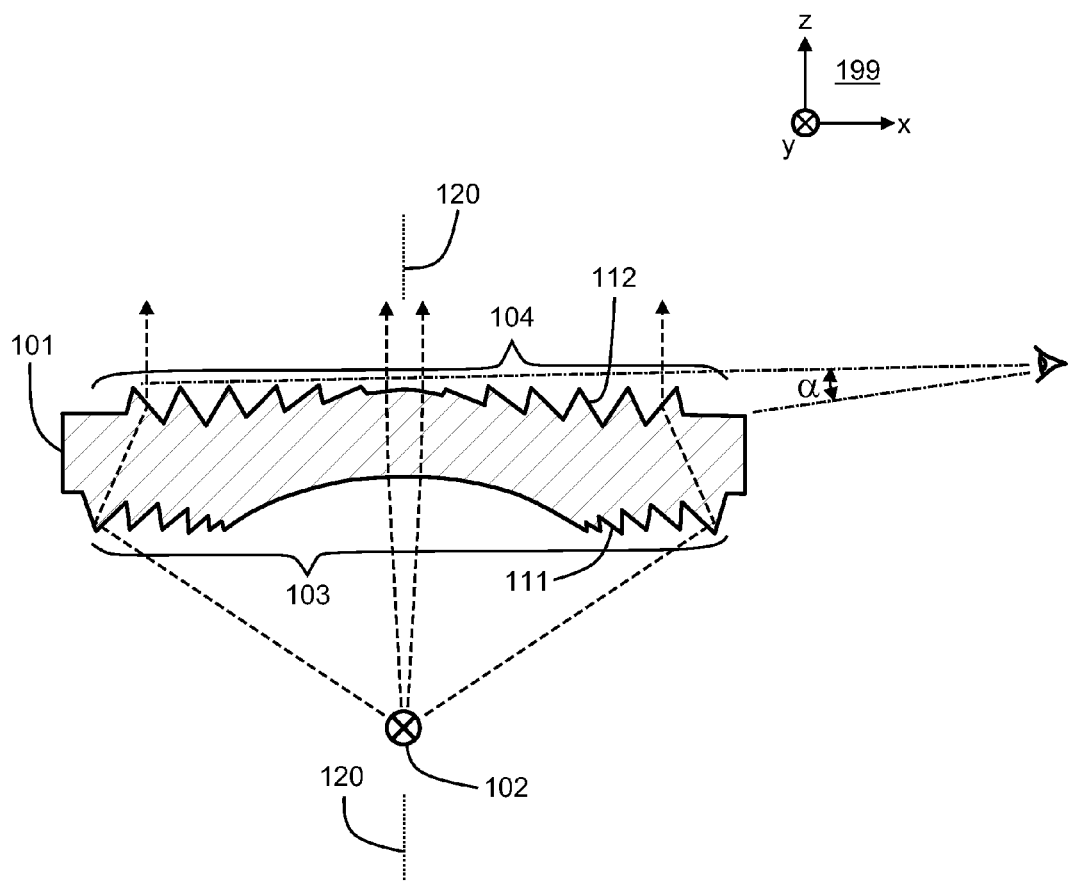
FIG. 1 shows a section view of a light guide according to the prior art.
Figure 2A:
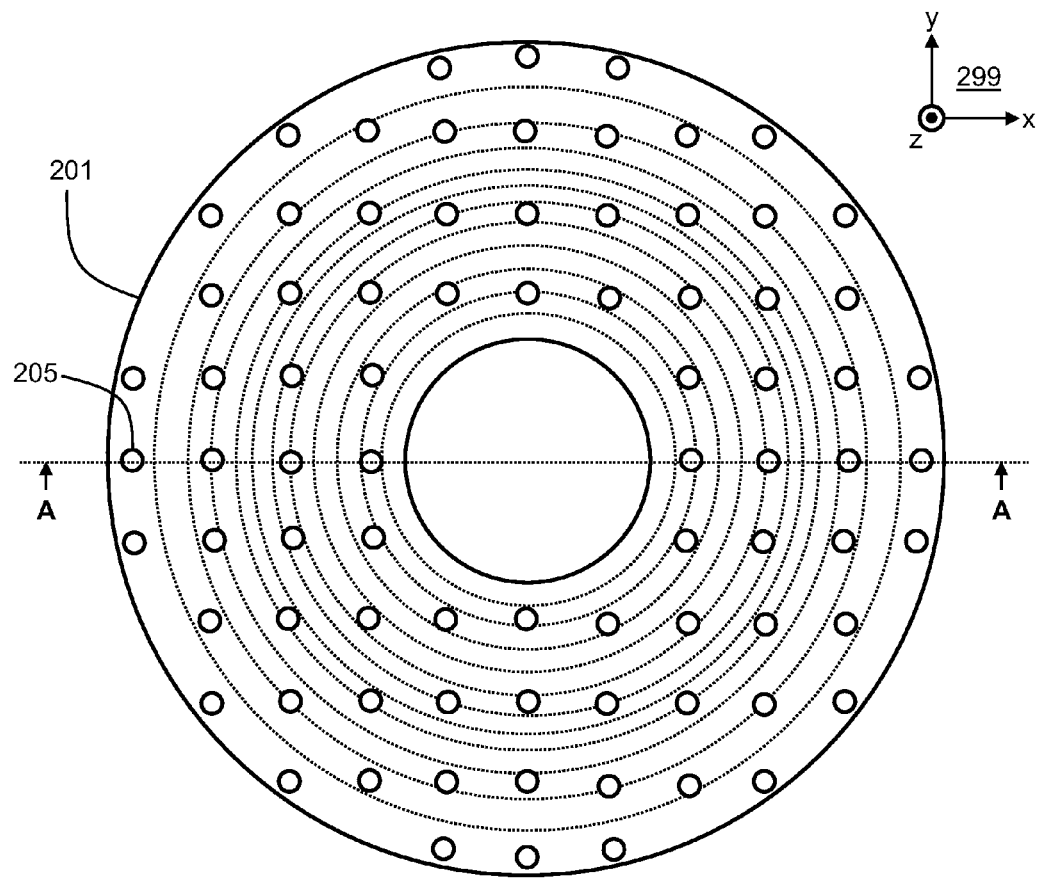
FIGS. 2a, 2b, 2c and 2d illustrate a light guide according to an exemplifying embodiment of the invention.
Figure 2B:
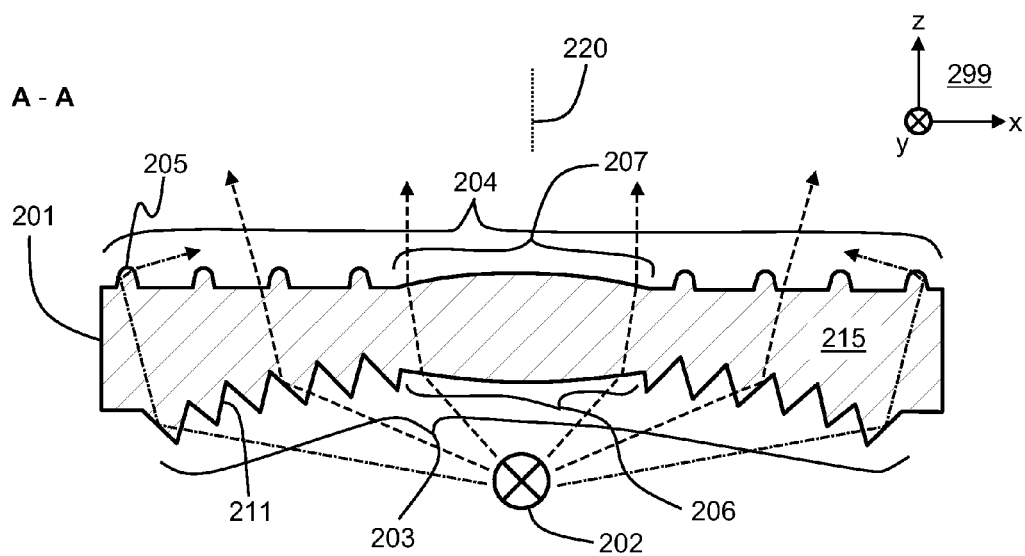
Figure 2C:
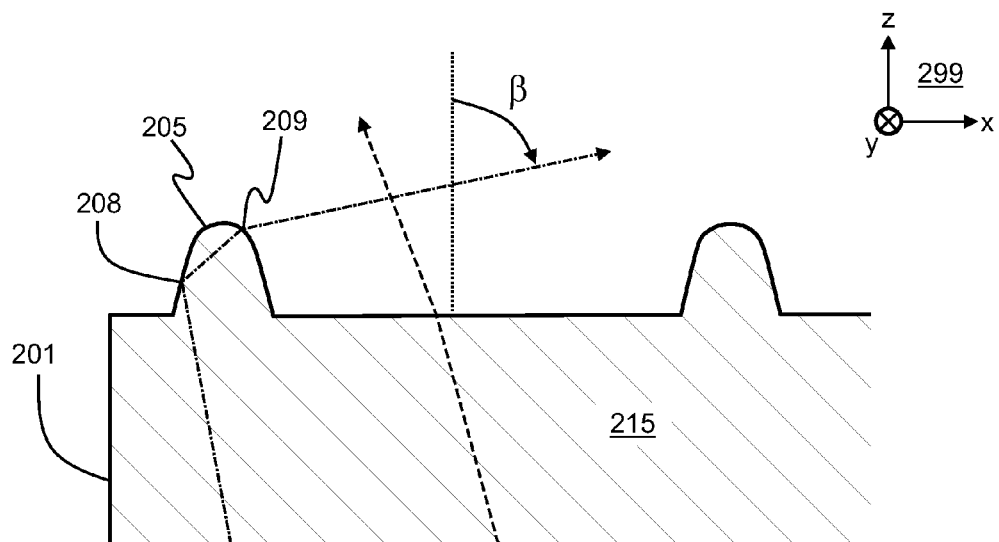
Figure 2D:
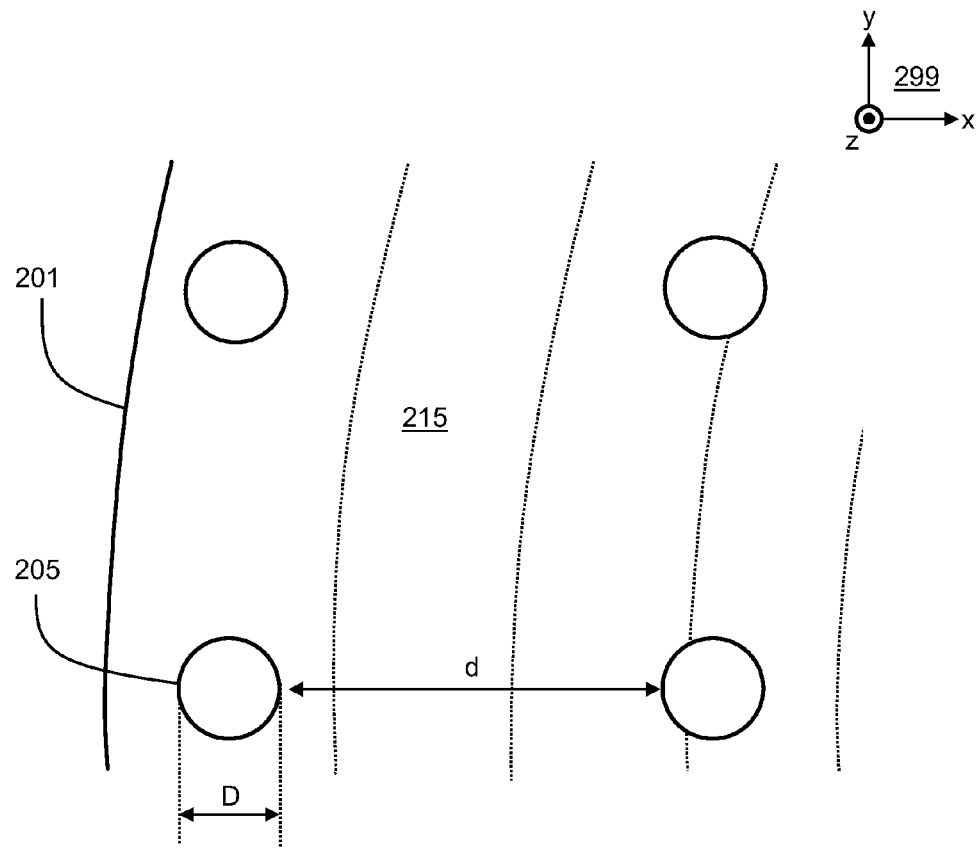

FIGS. 2a, 2b, 2c and 2d illustrate a light guide 201 according to an exemplifying embodiment of the invention for modifying the light distribution pattern of a light source 202 that may comprise, for example but not necessarily, one or more light emitting diodes "LED", one or more filament lamps, or one or more gas-discharge lamps. FIG. 2b shows a view of a section of the light guide 201 where the section has been taken along the line A-A shown in FIG. 2a. Furthermore, FIG. 2b illustrates the position of the light source 202 with respect to the light guide 201. FIG. 2c shows a magnification of a part of FIG. 2b, and FIG. 2d shows a magnification of a part of FIG. 2a.

The light guide 201 comprises a transparent element 215 made of solid transparent material having the refractive index greater than unity. The transparent material can be, for example, acrylic plastic, polycarbonate, optical silicone, or glass. The method of manufacture of the transparent element 215 can be for example mold casting. The transparent element 215 comprises a first surface 203 for acting as a light-ingress surface for receiving light emitted by the light source 202, and a second surface 204 for acting as a light-egress surface where the light exits the light guide 201. The second surface 204 comprises elevations for directing a first part of the light into directions that are sideward with respect to a direction in which a second part of the light exits the transparent element 215 through the second surface 204, where the second part of the light is more than half of all of the light exiting the transparent element 215 through the second surface 204. The first part of the light directed sideward by the elevations is advantageously at least 3% and at most 20% of all of the light exiting the transparent element 215 through the second surface 204. One of the elevations is denoted with the reference number 205 in FIGS. 2a-2d. In FIGS. 2b and 2c, some of the light beams belonging to the sideward directed first part of the light are depicted with dash-and-dot line arrows and some of the light beams belonging to the second part of the light are depicted with dashed line arrows.

As illustrated in FIG. 2c, the elevation 205 is shaped to provide total internal reflection for a light beam belonging to the first part of the light at a first point 208 of the surface of the elevation and refract the reflected light beam at a second point 209 of the surface of the elevation so as to direct the light beam sideward. The elevations are advantageously shaped so that the angle β shown in FIG. 2c is at least 80 degrees. The angle β can be defined to be the angle between the symmetry axis of the radiation lobe of the second part of the light and the direction of intensity maximum of the sideward directed first part of the light. The angle β can be measured, for example, with aid of a first projection screen that is perpendicular to the z-axis of a coordinate system 299 and arranged to receive the second part of the light and with a second projection screen that is perpendicular to the first projection screen and arranged to receive the sideward directed first part of the light. The elevations are nodules each tapering towards the tip of the nodule and surrounded by areas of the second surface between the nodules.

In the exemplifying light guide 201 illustrated in FIGS. 2a-2d, the first surface 203 comprises a first portion 206 and a second portion surrounding the first portion. The second portion of the first surface is provided with prism ridges for directing light towards the second surface 204 so that each prism ridge is shaped to provide total internal reflection for a light beam entered the prism ridge under consideration. In FIG. 2b, one of the prism ridges is denoted with the reference number 211. As illustrated by dashed circles shown in FIG. 2a, the prism ridges are formed concentrically around the geometric line 220 shown in FIG. 2b. The prism ridges do not, however, necessarily need to be rotationally symmetrical. The second surface 204 comprises a first portion 207 and a second portion surrounding the first portion. The second portion of the second surface 204 comprises the nodules for directing the first part of the light into the directions sideward with respect to the direction in which the second part of the light exits the transparent element through the second surface.

In the exemplifying light guide 201 illustrated in FIGS. 2a-2d, both the first portion 206 of the first surface 203 and the first portion 207 of the second surface 204 are shaped to be convex as shown in FIG. 2b. In light guides according to other exemplifying embodiments of the invention, the first portion 206 of the first surface 203 can be planar or concave. Correspondingly, the first portion 207 of the second surface 204 can be planar or concave.

Figure 3A:
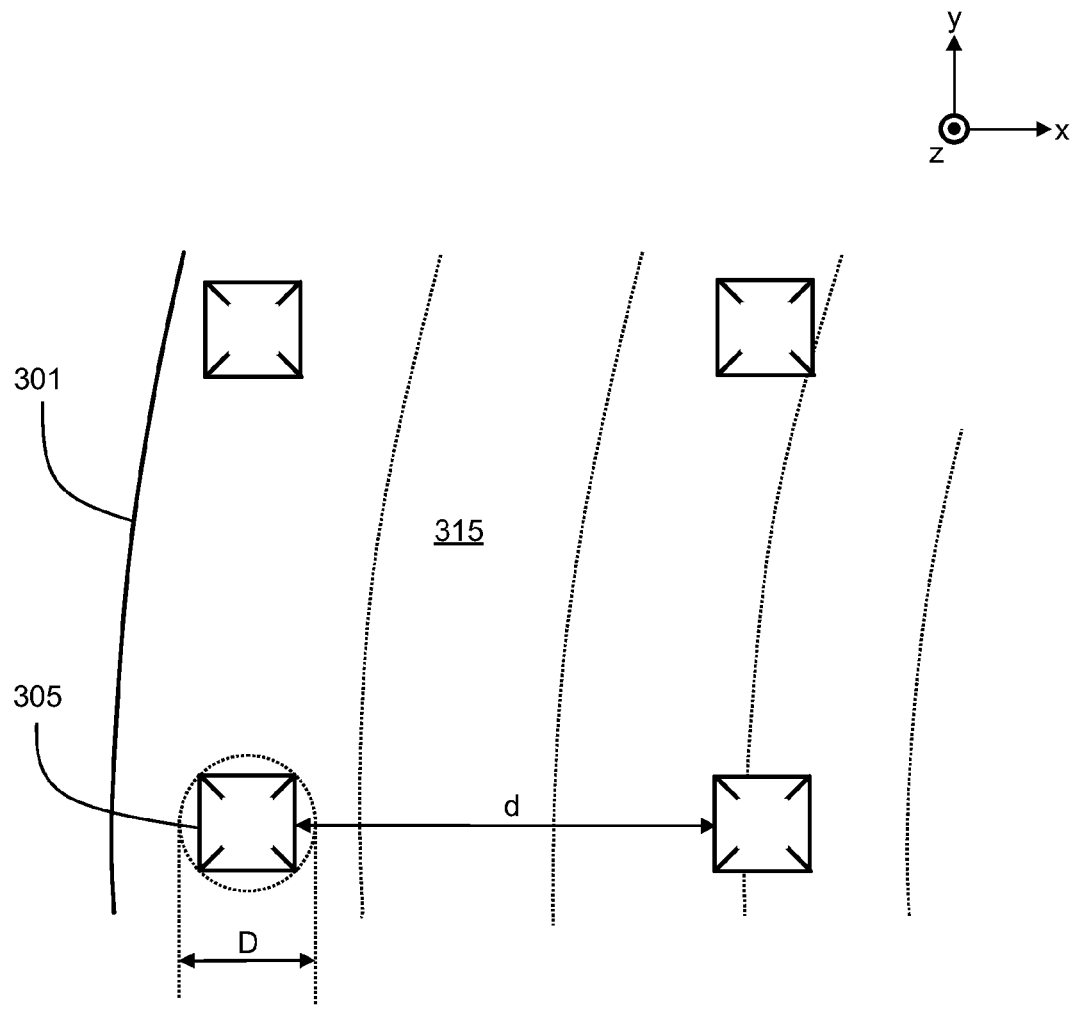
FIG. 3a illustrates a detail of a light guide according to an exemplifying embodiment of the invention.

As illustrated in FIGS. 2a and 2d, each nodule of the light guide 201 is rotationally symmetric with respect to a geometric line parallel with the direction of the height of the nodule under consideration, i.e. parallel with the z-axis of the coordinate system 299. It is to be, however, noted that the nodules do not necessarily have to be rotationally symmetric. FIG. 3a illustrates a detail of a light guide 301 according to another exemplifying embodiment of the invention. FIG. 3a shows a view corresponding to that shown in FIG. 2d. In the exemplifying case illustrated in FIG. 3a, each elevation is a nodule having a square-shaped base connecting to the rest of a transparent element 315 of the light guide 301. In FIG. 3a, one of the elevations, i.e. one of the nodules, is denoted with the reference number 305. It is also possible that a light guide comprises nodules, or other elevations, having mutually different shapes.

In a light guide according to an exemplifying embodiment of the invention, the diameter of the smallest circle capable of surrounding the base of each nodule is at most 25% of the smallest distance between adjacent ones of the nodules. In a light guide according to another exemplifying embodiment of the invention, the diameter of the smallest circle capable of surrounding the base of each nodule is at most 10% of a smallest distance between adjacent ones of the nodules. In practice, the smallest distance between adjacent ones of the nodules can be e.g. 10 mm and the diameter of the smallest circle capable of surrounding the base of each nodule can be e.g. 0.6 mm. The above-mentioned diameter of the smallest circle capable of surrounding the base of each nodule is denoted with D in FIGS. 2d and 3a, and the above-mentioned smallest distance between adjacent ones of the nodules is denoted with d in FIGS. 2d and 3a.

Figure 3B:
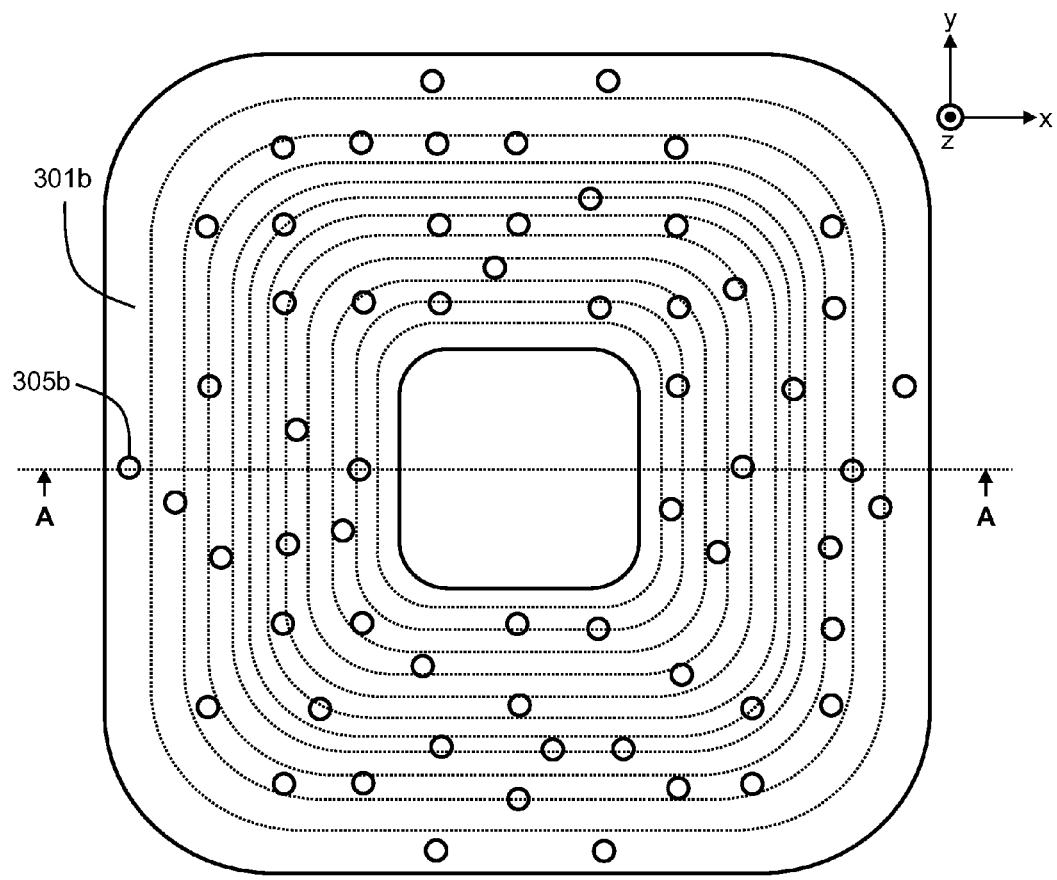
FIGS. 3b and 3c illustrate a light guide according to an exemplifying embodiment of the invention.
Figure 3C:
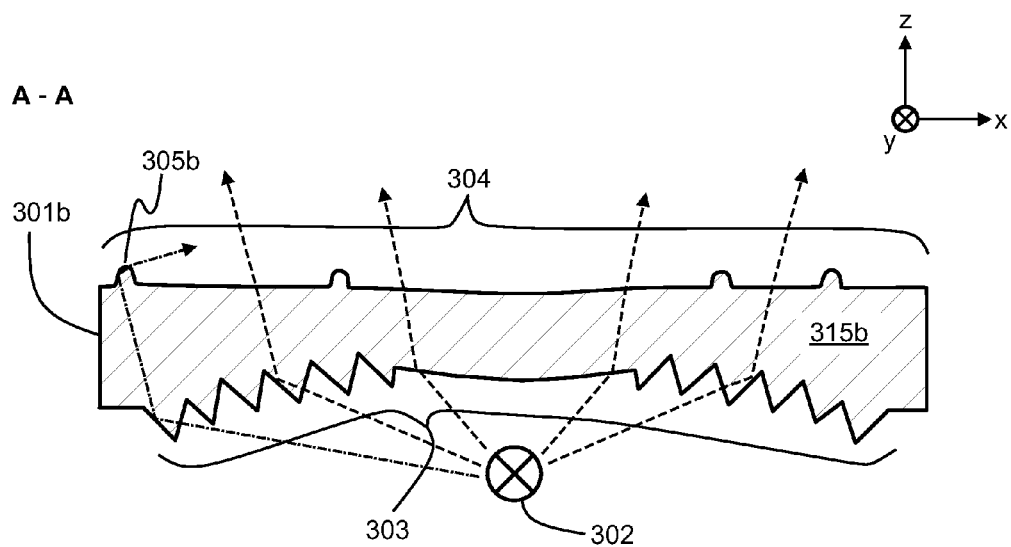

FIGS. 3b and 3c illustrate a light guide 301b according to an exemplifying embodiment of the invention for modifying the light distribution pattern of a light source 302. FIG. 3c shows a view of a section of the light guide 301b where the section has been taken along the line A-A shown in FIG. 3b. Furthermore, FIG. 3c illustrates the position of the light source 302 with respect to the light guide 301b. The light guide 301b comprises a transparent element 315b made of solid transparent material having the refractive index greater than unity. The transparent element 315b comprises a first surface 303 for acting as a light-ingress surface, and a second surface 304 for acting as a light-egress surface. The second surface 304 comprises elevations for directing a first part of the light into directions sideward with respect to a direction in which a second and greater part of the light exits the transparent element through the second surface. One of the elevations is denoted with the reference number 305b in FIGS. 3b and 3c. One of the light beams belonging to the sideward directed first part of the light are depicted with a dash-and-dot line arrow and some of the light beams belonging to the second part of the light are depicted with dashed line arrows. In this exemplifying case, the elevations for directing light sideward are nodules that are located in an irregular pattern as illustrated by FIG. 3b.

Figure 4A:
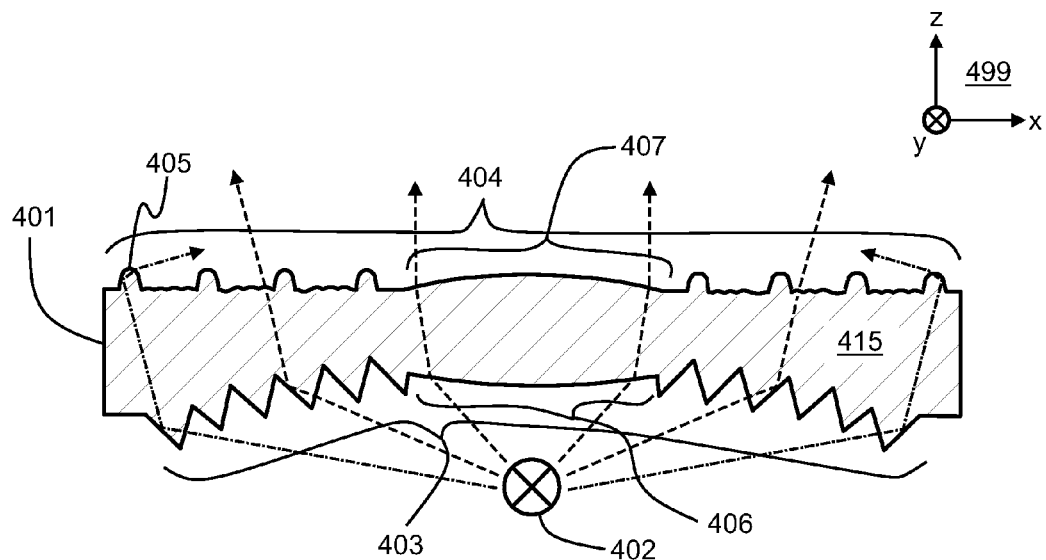
FIGS. 4a and 4b illustrate a light guide according to an exemplifying embodiment of the invention.
Figure 4B:
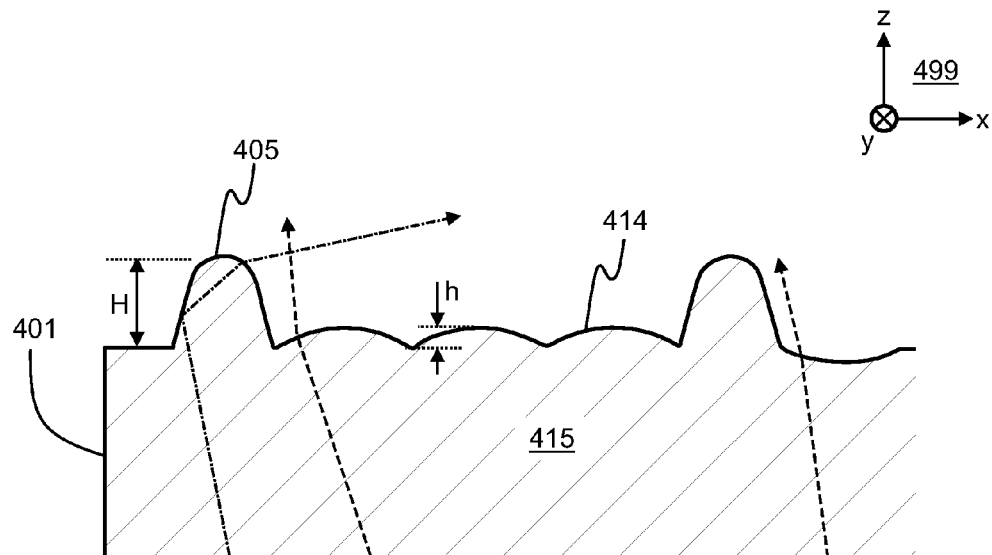

FIGS. 4a and 4b illustrate a light guide 401 according to an exemplifying embodiment of the invention for modifying the light distribution pattern of a light source 402. FIG. 4a shows a view of a section of the light guide 401 where the section has been taken along a section plane parallel with the xz-plane of a coordinate system 499. Furthermore, FIG. 4a illustrates the position of the light source 402 with respect to the light guide 401. FIG. 4b shows a magnification of a part of FIG. 4a. The light guide 401 comprises a transparent element 415 made of solid transparent material having the refractive index greater than unity. The transparent element 415 comprises a first surface 403 for acting as a light-ingress surface, and a second surface 404 for acting as a light-egress surface. The second surface 404 comprises elevations for directing a first part of the light into directions sideward with respect to a direction in which a second and greater part of the light exits the transparent element through the second surface. One of the elevations is denoted with the reference number 405 in FIGS. 4a and 4b. In FIGS. 4a and 4b, some of the light beams belonging to the sideward directed first part of the light are depicted with dash-and-dot line arrows and some of the light beams belonging to the second part of the light are depicted with dashed line arrows.

In the exemplifying light guide 401 illustrated in FIGS. 4a and 4b, the second surface 404 of the transparent element comprises undulations 414 on areas between the elevations. The undulations are suitable for modifying the distribution of the second part of the light. For example, the undulations may comprise converging and diverging deviations from a planar shape so that the surfaces provided with the undulations are color mixing surfaces. In a color mixing surface, light beams exhibiting different wavelengths are effectively mixed thus producing a light pattern which contains all wavelengths evenly distributed across the pattern. By equipping the light guide 401 with color mixing surfaces of the kind described above, different colors resulting from defects in the light source 402 are effectively mixed thus producing a solid light pattern.

In a light guide according to an exemplifying embodiment of the invention, the height difference between the valleys and the crests of the undulations 414 is at most 50% of the heights of the elevations. In FIG. 4b, the height difference between the valleys and the crests of the undulations is denoted with h and the heights of the elevations are denoted with H. In a light guide according to an exemplifying embodiment of the invention, the height difference h between the valleys and the crests of the undulations is at most 25% of the heights H of the elevations.

In the exemplifying light guide 401 illustrated in FIGS. 4a and 4b, the first surface 403 comprises a first portion 406 and, in addition, a second portion that comprises prism ridges for directing light towards the second surface 404. The second surface 404 comprises a first portion 407 and, in addition, a second portion that comprises the above-mentioned elevations and undulations. The transparent element 415 can be dimensioned for example so that more than 80% of the light directed to the first surface 403 is received at the first portion 406 of the first surface and exits the transparent element through the first portion 407 of the second surface 403, and less than 20% of the said light is received at the second portion of the first surface and exits the transparent element through the second portion of the second surface, and less than 5% of the said light is directed sideward by the elevations of the second portion of the second surface. The second portions of the first and second surfaces can be used, for example, for providing a light distribution pattern which produces a gradually fading border area between illuminated and non-illuminated areas instead of a sharp border between the illuminated and non-illuminated areas.

Figure 5:
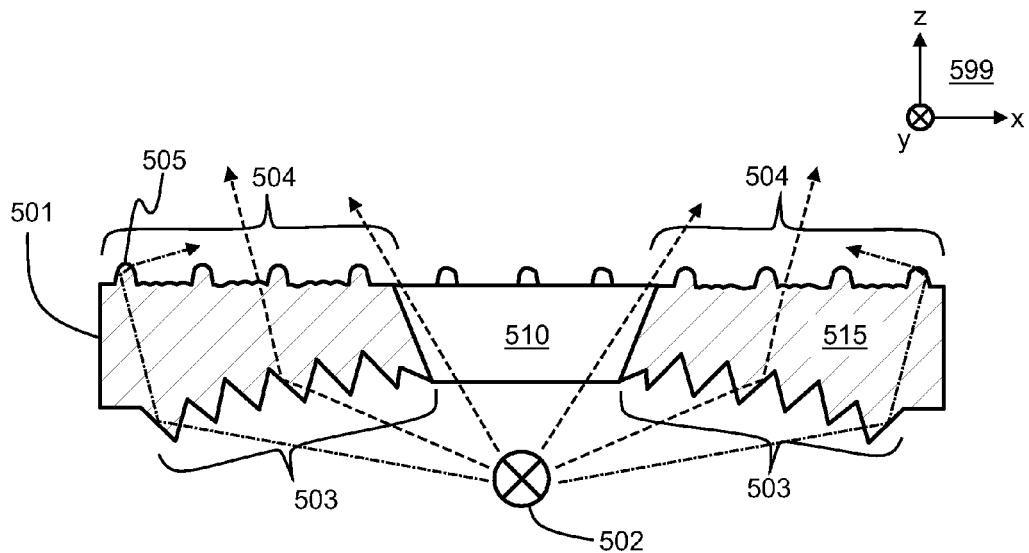
FIG. 5 shows a section view of a light guide according to an exemplifying embodiment of the invention.

FIG. 5 shows a section view of a light guide 501 according to an exemplifying embodiment of the invention for modifying the light distribution pattern of a light source 502. The section has been taken along a section plane parallel with the xz-plane of a coordinate system 599. Furthermore, FIG. 5 illustrates the position of the light source 502 with respect to the light guide 501. The light guide 501 comprises a transparent element 515 made of solid transparent material having the refractive index greater than unity. The transparent element 515 comprises a first surface 503 for acting as a light-ingress surface, and a second surface 504 for acting as a light-egress surface. The second surface 504 comprises elevations for directing a first part of the light into directions sideward with respect to a direction in which a second and greater part of the light exits the transparent element through the second surface. One of the elevations is denoted with the reference number 505 in FIG. 5. In FIG. 5, some of the light beams belonging to the sideward directed first part of the light are depicted with dash-and-dot line arrows and some of the light beams belonging to the second part of the light are depicted with dashed line arrows. In this exemplifying case, the transparent element 515 comprises an aperture 510 which allows a part of the light to propagate without being attenuated by the material of the transparent element 515.

Figure 6:
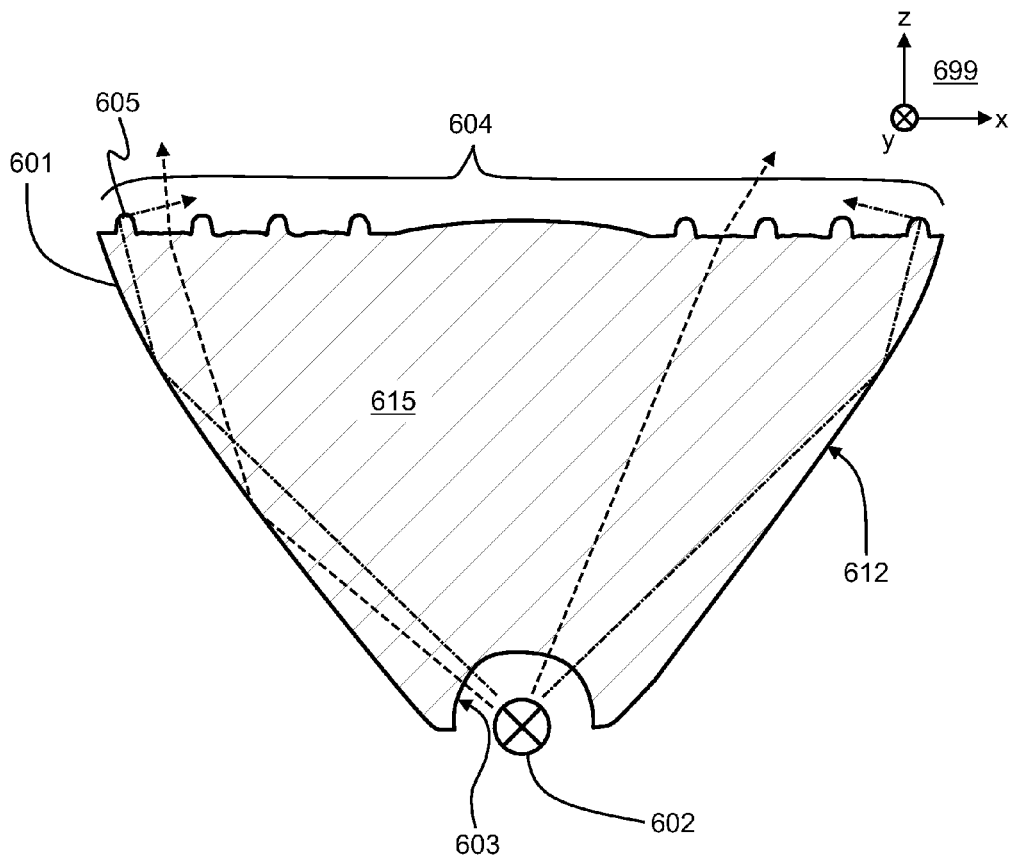
FIG. 6 shows a section view of a light guide according to an exemplifying embodiment of the invention.

FIG. 6 shows a section view of a light guide 601 according to an exemplifying embodiment of the invention for modifying the light distribution pattern of a light source 602. The section has been taken along a section plane parallel with the xz-plane of a coordinate system 699. Furthermore, FIG. 6 illustrates the position of the light source 602 with respect to the light guide 601. The light guide 601 comprises a transparent element 615 made of solid transparent material having the refractive index greater than unity. The transparent element 615 comprises a first surface 603 for acting as a light-ingress surface, and a second surface 604 for acting as a light-egress surface. The second surface 604 comprises elevations for directing a first part of the light into directions sideward with respect to a direction in which a second and greater part of the light exits the transparent element through the second surface. One of the elevations is denoted with the reference number 605 in FIG. 6. In FIG. 6, some of the light beams belonging to the sideward directed first part of the light are depicted with dash-and-dot line arrows and some of the light beams belonging to the second part of the light are depicted with dashed line arrows. In this exemplifying case, the transparent element 615 comprises a reflective surface 612 which provides total internal reflection for directing the light falling to the reflective surface 612 towards the second surface 604.

Figure 7A:
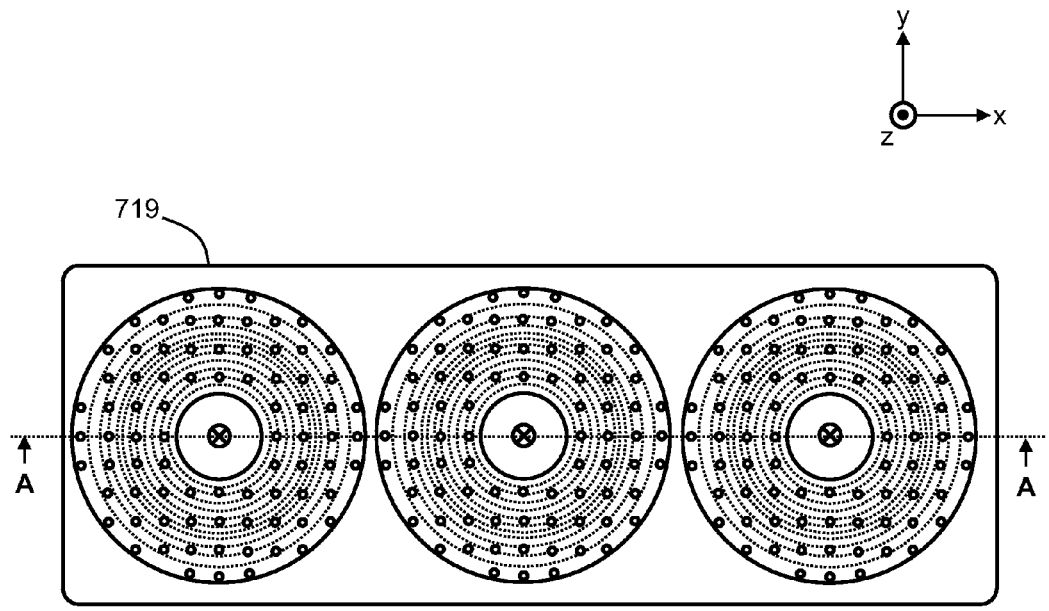
FIGS. 7a and 7b illustrate an illuminator device according to an exemplifying embodiment of the invention.
Figure 7B:
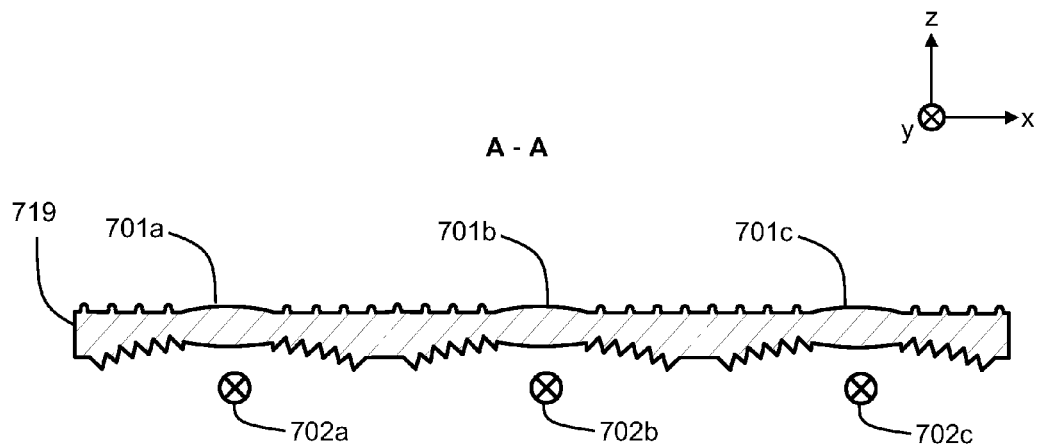

FIGS. 7a and 7b illustrate an illuminator device according to an exemplifying embodiment of the invention. FIG. 7b shows a view of a section taken along the line A-A shown in FIG. 7a. The illuminator device comprises light sources 702a, 702b and 702c, and light guides 701a, 701b and 701c. Each of the light guides is according to an embodiment of the invention. Each of the light sources 702a-702c may comprise at least one light emitting diode "LED". In the exemplifying case illustrated in FIGS. 7a and 7b, the light guides 701a-701c are parts of a single piece 719 of transparent material.

The specific examples provided in the description given above should not be construed as limiting the scope and/or the applicability of the appended claims. In the above-presented examples, the light guide comprises only transparent material. However, in some cases, the light guide may comprise also parts made of non-transparent material such as, for example, parts for providing mechanical support to the light source.

What is claimed is:

1. A light guide for modifying a light distribution pattern of a light source, the light guide comprising a transparent element made of transparent material having refractive index greater than unity and the transparent element comprising:
   a first surface for acting as a light-ingress surface for receiving light, and
   a second surface for acting as a light-egress surface,
   wherein the second surface comprises one or more elevations for directing a first part of the light into one or more directions sideward with respect to a direction in which a second part of the light exits the transparent element through the second surface, the second part of the light being more than half of the light exiting the transparent element through the second surface, and each elevation being shaped to provide total internal reflection for a light beam belonging to the first part of the light at a first point of a surface of the elevation and refract the reflected light beam at a second point of the surface of the elevation, wherein the elevations are nodules each being surrounded by areas of the second surface between the nodules, and a diameter of a smallest circle capable of surrounding a base of one or more of the nodules is at most 10% of the smallest distance between adjacent ones of the nodules.

2. The light guide according to claim 1, wherein the second surface further comprises undulations on areas between the elevations, the undulations being suitable for modifying a distribution of the second part of the light.

3. The light guide according to claim 2, wherein a height difference between valleys and crests of the undulations is at most 50% of heights of the elevations.

4. The light guide according to claim 3, wherein the height difference between the valleys and the crests of the undulations is at most 25% of the heights of the elevations.

5. The light guide according to claim 1, wherein each of the nodules is rotationally symmetric with respect to a geometric line parallel with the direction of the height of the nodule under consideration.

6. The light guide according to claim 1, wherein the first surface comprises a first portion and a second portion surrounding the first portion and provided with prism ridges for directing light towards the second surface so that each prism ridge is shaped to provide total internal reflection for a light beam entered the prism ridge.

7. The light guide according to claim 6, wherein the first portion of the first surface is shaped to be one of the following: convex, planar, concave.

8. The light guide according to claim 6, wherein the second surface comprises a first portion and a second portion surrounding the first portion and comprising the elevations for directing the first part of the light into the one or more directions sideward with respect to the direction in which the second part of the light exits the transparent element through the second surface.

9. The light guide according to claim 8, wherein the first portion of the second surface is shaped to be one of the following: convex, planar, concave.

10. The light guide according to claim 1, wherein the first part of the light directed sideward by the elevations is at least 3% and at most 20% of the light exiting the transparent element through the second surface.

11. The light guide according to claim 1, wherein the transparent material of the light guide is one of the following: acrylic plastic, polycarbonate, optical silicone.

12. An illuminator device comprising one or more light guides and one or more light sources for emitting light, each of the light guides comprising a transparent element made of transparent material having refractive index greater than unity and the transparent element comprising:
   a first surface for acting as a light-ingress surface for receiving light from one of the light sources, and
   a second surface for acting as a light-egress surface,
   wherein the second surface comprises one or more elevations for directing a first part of the light into one or more directions sideward with respect to a direction in which a second part of the light exits the transparent element through the second surface, the second part of the light being more than half of the light exiting the transparent element through the second surface, and each elevation being shaped to provide total internal reflection for a light beam belonging to the first part of the light at a first point of a surface of the elevation and refract the reflected light beam at a second point of the surface of the elevation, wherein the elevations are nodules each being surrounded by areas of the second surface between the nodules, and a diameter of a smallest circle capable of surrounding a base of one or more of the nodules is at most 10% of the smallest distance between adjacent ones of the nodules.

13. The illuminator device according to claim 12, wherein the transparent elements of the one or more light guides are parts of a single piece of the transparent material.

14. A mold having a form suitable for manufacturing, by mold casting, the transparent element of a light guide, the transparent element comprising:
   a first surface for acting as a light-ingress surface for receiving light, and
   a second surface for acting as a light-egress surface,
   wherein the second surface comprises one or more elevations for directing a first part of the light into one or more directions sideward with respect to a direction in which a second part of the light exits the transparent element through the second surface, the second part of the light being more than half of the light exiting the transparent element through the second surface, and each elevation being shaped to provide total internal reflection for a light beam belonging to the first part of the light at a first point of a surface of the elevation and refract the reflected light beam at a second point of the surface of the elevation, wherein the elevations are nodules each being surrounded by areas of the second surface between the nodules, and a diameter of a smallest circle capable of surrounding a base of one or more of the nodules is at most 10% of the smallest distance between adjacent ones of the nodules.

15. The light guide according to claim 7, wherein the second surface comprises a first portion and a second portion surrounding the first portion and comprising the elevations for directing the first part of the light into the one or more directions sideward with respect to the direction in which the second part of the light exits the transparent element through the second surface.

* * * * *